(12) United States Patent
Hirabayashi et al.

(10) Patent No.: US 8,351,208 B2
(45) Date of Patent: Jan. 8, 2013

(54) ELECTRO-OPTICAL DEVICE AND ELECTRONIC APPARATUS

(75) Inventors: Hidekazu Hirabayashi, Shiojiri (JP); Yoshitaka Hama, Chino (JP)

(73) Assignee: Seiko Epson Corporation, Tokyo (JP)

( * ) Notice: Subject to any disclaimer, the term of this patent is extended or adjusted under 35 U.S.C. 154(b) by 208 days.

(21) Appl. No.: 13/025,351

(22) Filed: Feb. 11, 2011

(65) Prior Publication Data

US 2011/0199733 A1 Aug. 18, 2011

(30) Foreign Application Priority Data

Feb. 16, 2010 (JP) ................................. 2010-030998

(51) Int. Cl.
*H05K 7/20* (2006.01)
*G02F 1/03* (2006.01)

(52) U.S. Cl. .............. 361/707; 361/679.01; 361/679.21; 361/679.46; 361/679.54; 361/704; 361/709; 361/710; 361/715; 165/80.3; 165/104.33; 165/185; 349/58; 349/149; 349/150; 349/151; 349/152; 349/62; 349/161; 359/245; 359/263; 313/46; 313/110

(58) Field of Classification Search ............. 361/679.01, 361/679.02, 679.21, 679.46–679.54, 690–697, 361/704–717, 719–724, 737, 752, 760–767; 165/80.2, 80.3, 80.4, 104.33, 104.34, 121–126, 165/185; 257/706–727; 174/15.1, 16.3, 174/250–264, 520; 349/5, 58–65, 26, 71, 349/72, 40, 111–113, 122, 158, 161, 153, 349/145, 138; 345/152, 173, 174, 204, 60–100; 359/204–213, 245, 263, 322, 629, 250, 251, 359/690–699, 525, 894; 313/46, 110, 498; 353/20, 54, 57; 29/592.1
See application file for complete search history.

(56) References Cited

U.S. PATENT DOCUMENTS

| | | | | |
|---|---|---|---|---|
| 5,299,038 A | * | 3/1994 | Hamada et al. | 349/161 |
| 5,406,399 A | * | 4/1995 | Koike | 349/58 |
| 5,742,366 A | * | 4/1998 | Imoto | 349/62 |
| 5,835,179 A | * | 11/1998 | Yamanaka | 349/161 |
| 5,880,795 A | * | 3/1999 | Nagata et al. | 349/58 |
| 6,414,781 B1 | * | 7/2002 | Saitoh | 359/245 |
| 6,498,672 B2 | * | 12/2002 | Saitoh | 359/245 |
| 6,882,480 B2 | * | 4/2005 | Yanagisawa | 359/634 |
| 6,906,774 B2 | * | 6/2005 | Saitoh | 349/153 |
| 6,950,308 B2 | * | 9/2005 | Saitoh et al. | 361/704 |
| 7,023,504 B2 | * | 4/2006 | Miyashita et al. | 349/58 |
| 7,093,960 B2 | * | 8/2006 | Kojima et al. | 362/294 |
| 7,218,373 B2 | * | 5/2007 | Kojima et al. | 349/161 |
| 7,245,334 B2 | * | 7/2007 | Miyashita et al. | 349/58 |
| 7,256,856 B2 | * | 8/2007 | Imaeda | 349/145 |

(Continued)

FOREIGN PATENT DOCUMENTS

JP 2005-134567 A 5/2005

(Continued)

*Primary Examiner* — Michail V Datskovskiy
(74) *Attorney, Agent, or Firm* — AdvantEdge Law Group, LLC

(57) ABSTRACT

An electro-optical device may include: an electro-optical panel, a holding member that includes a main body part arranged to surround the periphery of the electro-optical panel, and a holding part protruded from the main body part and holding the electro-optical panel, and a heat radiating member that is disposed opposing the electro-optical panel through an opening of the holding member from the opposite side of the light incident plane of the electro-optical panel.

7 Claims, 7 Drawing Sheets

U.S. PATENT DOCUMENTS

| | | | |
|---|---|---|---|
| 7,257,306 B2 * | 8/2007 | Sakurai et al. | 385/147 |
| 7,263,269 B2 * | 8/2007 | Miyashita | 385/147 |
| 7,289,172 B2 * | 10/2007 | Kojima et al. | 349/58 |
| 7,336,494 B2 * | 2/2008 | Nishimura et al. | 361/714 |
| 7,352,582 B2 * | 4/2008 | Yokoyama | 361/703 |
| 7,369,293 B2 * | 5/2008 | Miyashita | 359/254 |
| 7,746,659 B2 * | 6/2010 | Ito | 361/764 |
| 7,808,586 B2 * | 10/2010 | Mochizuki | 349/110 |
| 7,839,464 B2 * | 11/2010 | Lim | 349/58 |
| 7,967,454 B2 * | 6/2011 | Hirabayashi et al. | 353/122 |
| 8,184,432 B2 * | 5/2012 | Miyashita | 361/679.21 |

FOREIGN PATENT DOCUMENTS

| | | | |
|---|---|---|---|
| JP | 2006276623 A | * | 10/2006 |
| JP | 02008191360 A | * | 8/2008 |

* cited by examiner

ELECTRO-OPTICAL DEVICE AND ELECTRONIC APPARATUS

BACKGROUND

1. Technical Field

The present invention relates to an a technical field of an electro-optical device such as a liquid crystal light valve and the like, and an electronic apparatus including the electro-optical device, such as a liquid crystal projector, and the like.

2. Related Art

An electro-optical device, for example, an electro-optical panel such as a liquid crystal panel, and the like is mounted or housed in a mounting case, and is used as a light valve such as for a liquid crystal projector, and the like. For example, in JP-A-2005-134567, a reflective liquid crystal panel is fixed by a holding member integrally formed with a heat radiating member, from the opposite side of an incident plane where a light from a light source is incident.

However, in JP-A-2005-134567, a technical problem arises in that stress produced in the holding member is transmitted to a liquid crystal panel, whereby color irregularity occurs on the display image of the liquid crystal panel, and the display quality is reduced. For example, this primary electro-optical device attaches the holding member to a wall surface of an electric apparatus using a bolt, and the like when being attached to the electronic apparatus such as the liquid crystal projector, and the like. When the holding member is fastened by the bolt, distortion corresponding to the fastening force is generated in the holding member, thereby causing the occurrence of stress. Also, when heat exceeding the heat radiation performance of the heat radiating member is generated, the holding member may be deformed (that is, thermally expanded), thereby causing the occurrence of stress. When the stress is transmitted to the liquid crystal panel, the gap between substrates of the liquid crystal panel may be modified, whereby color irregularity may occur on the display image.

SUMMARY

An advantage of some aspects of the invention is to provide an electro-optical device which may reduce occurrence of color irregularity, and achieve high-quality image display, by suppressing stress generated inside the device, and an electronic apparatus including the electro-optical device.

According to an aspect of the present invention, there is provided an electro-optical device, including: an electro-optical panel; a holding member that includes a main body part arranged to surround the periphery of the electro-optical panel, and a holding part protruding from the main body part and holding the electro-optical panel; and a heat radiating member that is disposed opposing the electro-optical panel through an opening of the holding member from the opposite side of a light incident plane of the electro-optical panel.

The electro-optical panel according to the aspect of the invention may display an image on a display area by transmitting or reflecting a light source light emitted from, for example, a white lamp, and the like. For example, in a case of a reflective electro-optical panel, for example, light being incident to the display area may be modulated in a pixel unit, and then the light may be reflected by a reflective film such as Al (aluminum) film, thereby displaying an image. In the display area, for example, a plurality of pixels are arranged in a matrix form, and electrically connected to each of a scanning line supplying scanning signals and a data line supplying image signals. Each pixel controls an alignment state of electro-optical substances such as liquid crystal which are disposed opposing each other according to the potential of the image signal.

The "holding member" according to the aspect of the invention may be a member for holding the electro-optical panel, and may be configured to have a main body part and a holding part.

The main body part of the holding member may be arranged to surround the periphery of the electro-optical panel, thereby housing the electro-optical panel. Since the main body part may protect the electro-optical panel held inside the main body part from external factors, and may be a portion through which a bolt, and the like used when fastening the electro-optical device to a member to be mounted passes, the main body part may be typically formed to have a sufficient degree of rigidity.

The holding part of the holding member may be protruded from the main body part to hold the electro-optical panel. Due to this, the holding part may be typically formed to have a lower degree of rigidity in comparison with the main body part. For example, the main body part may be formed in bulk, whereas the holding part may have a plate shape extending from the main body part. In other words, the holding part may have elasticity in comparison with the main body part. Thus, for example, stress transmitted from the main body part to the electro-optical panel may be absorbed by the elasticity of the holding part, and stress transmitted to the electro-optical panel may be reduced.

The heat radiating member according to the aspect of the invention may be disposed opposing the electro-optical panel through the opening of the holding member from the opposite side of the light incident plane of the electro-optical panel. The heat radiating member may be provided in a rear side of the electro-optical panel so as not to interrupt a light path of incident light associated with image display, and may be formed by, for example, a metal material such as Al (aluminum), copper (Cu), or the like. Thus, in the heat radiating member, it is possible to efficiently heat-transfer and radiate heat generated in the electro-optical panel. In this configuration, particularly, since the heat radiating member is in contact with the electro-optical panel by an adhesive through the opening, or disposed opposing the electro-optical panel through a thermally-conductive member, it is possible to efficiently transmit the heat generated in the electro-optical panel to the heat radiating member. In this manner, by improving heat radiation efficiency, distortion (that is, occurrence of stress) of components of the electro-optical device, such as the holding member, due to the generated heat may be suppressed.

In this configuration, particularly, the heat radiating member may be disposed opposing the electro-optical panel through the opening formed in the holding part. In this manner, by providing the opening to the holding part, the contact area between the electro-optical panel and the holding part may be kept small. Here, since the magnitude of the stress transmitted from the holding member to the electro-optical panel may depend on the contact area between the holding part and the electro-optical panel, stress applied to the electro-optical panel may be reduced by reducing the contact area.

In addition, the holding part may be formed to extend from the main body part. The holding part may be integrally formed with the main body part, and may be formed with separate members fixed to each other. Also, since the heat radiating member may be disposed in the opening, which will be described later, the opening may be appropriately defined to correspond to a shape and size of the heat radiating member.

As described above, according to the aspect of the invention, it is possible to realize the electro-optical device in which the stress may be barely applied to the electro-optical panel, and a high-quality image display having less color irregularity may be achieved.

In the electro-optical device, according to the aspect of the invention, the holding part may be formed over the entire circumference of the opening of the holding member.

According to the configuration, the holding part may support the electro-optical panel to be in contact along an edge of the electro-optical panel. In this instance, since the holding part supports the edge over the entire circumference of the electro-optical panel, stability of the electro-optical panel supported by the holding part may be increased (that is, able to be more tightly held).

In the electro-optical device, according to the aspect of the invention, a part of the holding part may be protrusively formed in a convex shape from the main body part.

In the configuration, when compared with a case in which the holding part is widely formed, it is possible to reduce the contact area between the holding part and the electro-optical panel. Since the magnitude of the stress transmitted from the holding member to the electro-optical panel depends on the contact area between the holding part and the electro-optical panel, the stress applied to the electro-optical panel may be reduced by reducing the contact area.

In the electro-optical device according to another aspect of the invention, the holding member may include an adhesive opening formed in a portion of the holding part contacting the electro-optical panel, and the electro-optical panel may be fixed to the holding part by an adhesive filled in the adhesive opening.

In the configuration of the invention, by filling the adhesive in the opening for filling with the adhesive, which is formed in the holding part, it is possible to fix the electro-optical panel to the holding part. As described above, to reduce the stress transmitted to the electro-optical panel, it is preferable to reduce the contact area between the holding part and the electro-optical panel; however, there is a problem in that stability of the electro-optical panel supported by the holding part may be simultaneously reduced. In this embodiment, even in this case, it is possible to fix the electro-optical panel to the holding part using the adhesive, whereby the stress transmitted to the electro-optical device may be reduced while securing the stability of the electro-optical panel.

In the electro-optical device according to another aspect of the invention, the electro-optical device may further include a light shielding plate that may be provided to be in contact with the electro-optical panel and the holding member from the incident plane side of the electro-optical panel, and formed to at least partially surround a display area of the electro-optical panel.

In the configuration of the invention, the light shielding plate may be formed to at least partially surround the display area. The light shielding plate may be, for example, a parting plate. As a material of the light shielding plate, a material having lower light reflectance in comparison to a member (for example, the holding member, and the like) disposed in the periphery of the light shielding plate may be used.

In the configuration of the invention, particularly, the light shielding plate may be provided to be in contact with the holding member and the electro-optical panel from the incident plane side of the electro-optical panel. That is, the electro-optical panel may be arranged to be sandwiched by the light shielding plate and the holding part of the holding member from a vertical direction side while being held by the main body part of the holding member from the side surface side.

Since the light shielding plate typically has a plate shape, the light shielding plate may have elasticity in comparison with the holding member. Accordingly, the electro-optical panel is held by the light shielding plate from the surface side, so that stress generated in the holding member may be absorbed by the elasticity of the light shielding plate, thereby reducing stress to the electro-optical panel.

According to another aspect of the invention, the electro-optical device may further include a hook member that is provided to fix the heat radiating member to the holding member, from the opposite side of a plane of the heat radiating member opposing the electro-optical panel.

In this configuration, by fixing the heat radiating member by the hook member, it is possible to suppress the application of the stress to the electro-optical panel and the holding member, for example, in comparison with a case in which the heat radiating member is fixed by a screw, or the like.

An advantage of some aspects of the invention is to provide an electronic apparatus including the electro-optical device described above (however, including its various embodiments).

Since the electronic apparatus according to another aspect of the invention includes the above described electro-optical device of the invention, various electronic apparatuses such as a projection-type display device, a television, a cellular phone, an electronic diary, a word processor, a viewfinder-type or a monitor direct view-type video cassette recorder, a workstation, a video phone, a POS terminal, a touch panel, and the like capable of having high reliability and displaying high-quality images can be implemented. In addition, as the electronic apparatus according to another aspect of the invention, an electrophoresis device, for example, electronic paper, or the like may be implemented.

In addition, functions and other advantages of the invention will be apparent from description of exemplary embodiments of the invention, which will be described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the present invention will be described in detail with reference to the accompanying drawings. In the following embodiment, an electro-optical device including a reflective liquid crystal panel of a TFT active matrix drive type, that is, an example of an electro-optical panel will be described.

Electro-Optical Device

First Embodiment

Figure 1:
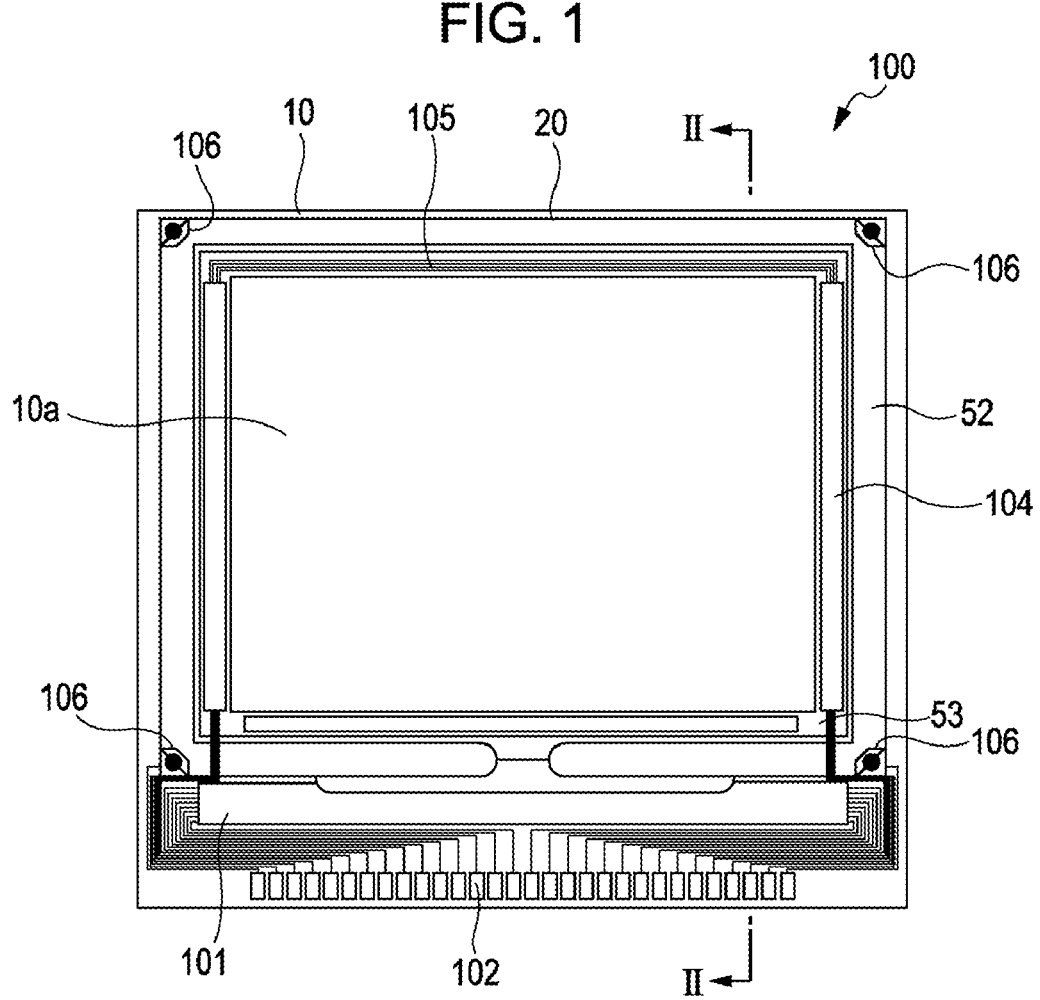
FIG. 1 is a plan view showing an overall configuration of a liquid crystal panel of an electro-optical device according to a first embodiment.
Figure 2:
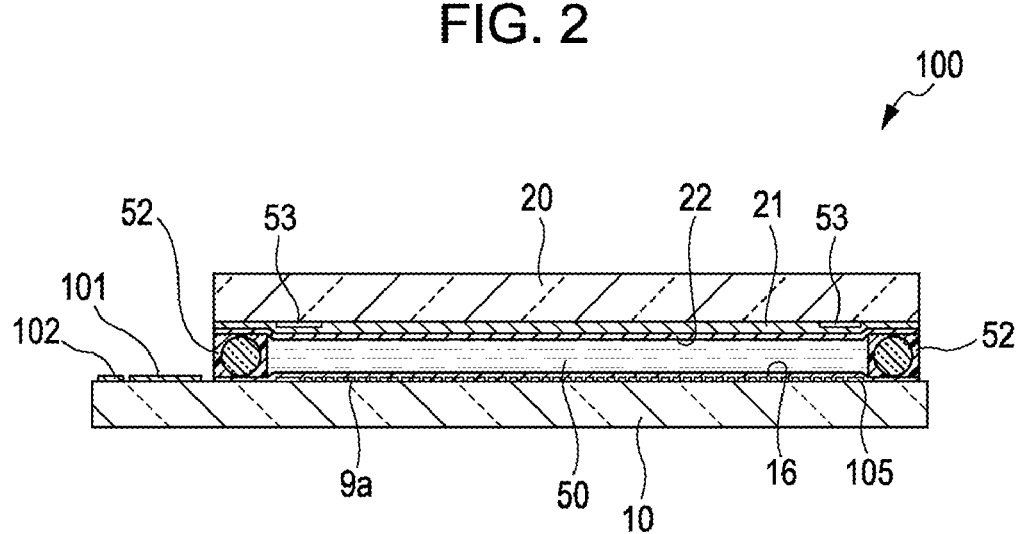
FIG. 2 is a cross-sectional view taken from II-II line of FIG. 1.

First, an overall configuration of a liquid crystal panel 100 included in an electro-optical device according to the embodiment will be described with reference to FIGS. 1 and 2. FIG. 1 is a plan view showing an overall configuration of a liquid crystal panel 100 of an electro-optical device according to a first embodiment, and FIG. 2 is a cross-sectional view taken from II-II line of FIG. 1.

The liquid crystal panel 100 may be configured such that a TFT array substrate 10 and an opposing substrate 20 are disposed opposing each other. The TFT array substrate 10 may be made of a transparent substrate, for example, such as a single crystal silicon substrate, a glass substrate, a quartz substrate, or the like, and the opposing substrate 20 may be made of a transparent substrate, for example, the glass substrate, the quartz substrate, or the like. A liquid crystal layer 50 is enclosed between the TFT array substrate 10 and the opposing substrate 20. For example, the liquid crystal 50 may be made of a mixture of one kind or several kinds of nematic liquid crystal, and may has a predetermined alignment state between a pair of alignment films.

The TFT array substrate 10 and the opposing substrate 20 may be bonded to each other by a sealing material 52 provided in a seal area positioned around an image display area 10a in which a plurality of pixel electrodes are provided. In addition, the image display area 10a may be an example of the "display area" of the invention.

The sealing material 52 may be made of, for example, an ultraviolet-curable resin, a thermosetting resin, or the like so as to bond two substrates. In a manufacturing process, the sealing material 52 may be cured by ultraviolet irradiation, heating, or the like after being coated on the TFT array substrate 10. In order to have a gap (that is, gap between substrates) between the TFT array substrate 10 and the opposing substrate 20 as a predetermined value, a gap material such as glass fibers, glass beads, or the like may be sprayed in the sealing material 52. In addition, the gap material may be arranged in the image display area 10a and the periphery area of the image display area 10a, in addition to or instead of a material mixed into the sealing material 52.

A frame light shielding film 53 having a light shielding property, which may partially define a frame area of the image display area 10a, may be provided in a side of the opposing substrate 20 in parallel to the inside of a seal area in which the sealing material 52 is disposed. The frame light shielding film 53 that is provided in the side of the opposing substrate 20 may partially define the image display area 10a.

Within the periphery area, in an area placed outside the seal area in which the sealing material 52 is disposed, a data line driving circuit 101 and an external circuit connection terminal 102 may be provided along a side of the TFT array substrate 10. A scanning line driving circuit 104 may be provided along two sides adjacent to the side in such a manner as to be covered by the frame light shielding film 53. Further, in order to connect two scanning line driving circuits 104 provided in both sides of the image display area 10a, a plurality of interconnections 105 may be provided along the remaining side of the TFT array substrate 10 in such a manner as to be covered by the frame light shielding film 53.

In an area opposing four corners of the opposing substrate 20 on the TFT array substrate 10, a vertical conductive terminal 106 for connecting two substrates using a vertical conductive material 107 may be disposed. Due to this, electric conduction may be performed between the TFT array substrate 10 and the opposing substrate 20.

As shown in FIG. 2, on the TFT array substrate 10, a stacked structure in which an interconnection such as a TFT for pixel switching, a scanning line, a data line, and the like, that is, a driving element is provided may be formed. A detailed configuration of this stacked structure is not shown in FIG. 2, however, a reflective pixel electrode 9a, that is, a reflective electrode may be provided on the stacked structure. The pixel electrode 9a may be typically formed in an island-shape to have a predetermined pattern for each pixel by a material having a superior light reflective property, such as aluminum or the like, thereby reflecting incident light.

The pixel electrode 9a may be formed on the pixel display area 10a of the TFT array substrate 10 to face the opposing electrode 21. On the surface of the TFT array substrate 10 that faces the liquid crystal layer 50, that is, on the pixel electrode 9a, an alignment film 16 may be formed to cover the pixel electrode 9a.

On the surface of the opposing substrate 20 facing the TFT array substrate 10, the opposing electrode 21 made of a transparent substance such as an ITO or the like may be formed to face a plurality of pixel electrodes 9a. Also, to perform a color display in the image display area 10a, a color filter not shown in FIG. 2 may be formed in an area including a part of an opening area and a part of a non-opening area. On the surface of the opposing substrate 20 facing the TFT array substrate 10, an alignment film 22 may be formed on the opposing electrode 21. In addition, like a transmission type liquid crystal device, on the opposing substrate 20, a light shielding film may be formed to have a grid shape or a strip shape, and the non-opening area may be formed.

In addition, on the TFT array substrate 10 shown in FIG. 1 and FIG. 2, a sampling circuit that samples an image signal on an image signal line and supplies the sampled image signal to the data line, a pre-charge circuit that supplies a pre-charge signal of a predetermined voltage level to a plurality of data lines prior to the image signal, an inspection circuit that inspects for quality, defects, and the like of a corresponding liquid crystal panel 100 in the manufacturing process or during shipping, may be formed in addition to the above described driving circuit such as the data line driving circuit 101, the scanning line driving circuit 104, and the like.

Next, an electrical configuration of a pixel unit of the liquid crystal panel 100 according to the embodiment will be described with reference to FIG. 3. Here, FIG. 3 is an equivalent circuit view showing various elements, interconnection, and the like in a plurality of pixels formed in a matrix form, which constitute the image display area 10a of the liquid crystal panel 100 of the electro-optical device according to the embodiment.

Figure 3:
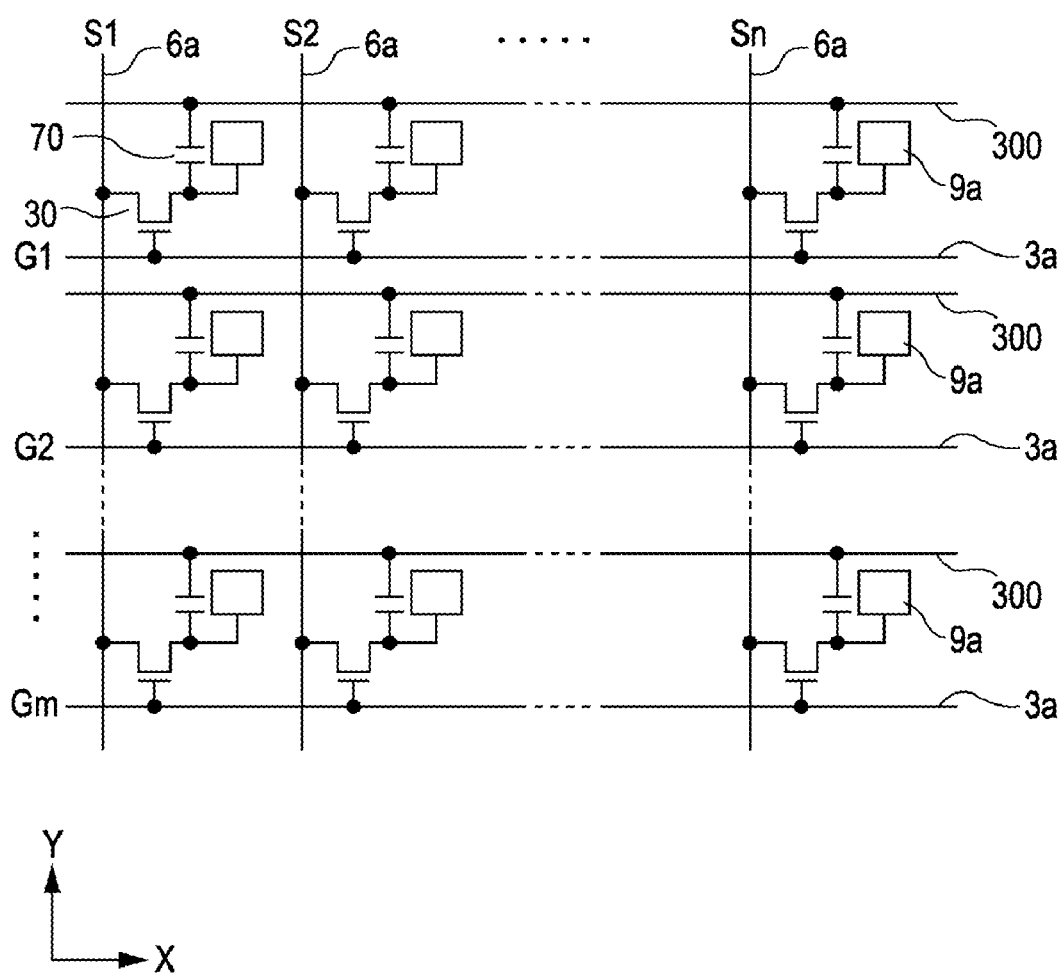
FIG. 3 is an equivalent circuit view showing various elements, interconnection, and the like in a plurality of pixels formed in a matrix form, which constitute an image display area of a liquid crystal panel of the electro-optical device according to the first embodiment.

In FIG. 3, in each of the plurality of pixels formed in the matrix form constituting the image display area 10a, the pixel electrode 9a and a TFT 30 may be formed. The TFT 30 may be electrically connected to the pixel electrode 9a, and may perform a switching-control on the pixel electrode 9a when the liquid crystal panel 100 is operated. A data line 6a through which the image signal is supplied may be electrically connected to a source of the TFT 30. Image signals S1, S2, ..., Sn that are written in the data line 6a may be sequentially supplied in this order, and may be supplied for each group, with respect to a plurality of data lines 6a adjacent to each other.

A scanning line 3a may be electrically connected to a gate of the TFT 30, and the liquid crystal panel 100 may be configured to sequentially apply, to the scanning line 3a, scanning signals G1, G2, ..., Gm in this order in a pulse-like manner at a predetermined timing. The pixel electrode 9a may be electrically connected to a drain of the TFT 30, and the image signals S1, S2, ..., Sn supplied from the data line 6a may be written at a predetermined timing by closing a switch of the TFT 30, that is, a switching element only for a predetermined period of time. The image signals S1, S2, ..., Sn of a predetermined level that are written in a liquid crystal through the pixel electrode 9a may be held in the opposing electrode formed on the opposing substrate for a predetermined period of time.

A liquid crystal constituting the liquid crystal layer 50 (see, FIG. 2) may modulate light to enable gradation display by changing an alignment or order of molecule cluster by an applied voltage level. For example, in a normally white mode, the transmittance with respect to incident light according to a voltage applied for each pixel unit may be reduced, and in a normally black mode, the transmittance with respect to the incident light according to a voltage applied for each pixel unit may be increased, whereby light having contrast corresponding to the image signal may be emitted from the liquid crystal panel 100 as a whole.

Here, to prevent leakage of the held image signals, an accumulation capacitor 70 may be added in parallel with a liquid crystal capacitor formed between the pixel electrode 9a and the opposing electrode 21 (see, FIG. 2). The accumulation capacitor 70 may be a capacitive element acting as an accumulation capacitor for temporarily maintaining a potential of each of the pixel electrodes 9a according to the supply of the image signals. One electrode of the accumulation capacitor 70 may be electrically connected to a drain of the TFT 30 in parallel with the pixel electrode 9a, and another electrode of the accumulation capacitor 70 may be electrically connected to a capacitor line 300 having a fixed potential so as to have a constant potential. Due to the accumulation capacitor 70, potential holding characteristics in the pixel electrode 9a may be improved, and improvement in display characteristics such as contrast enhancement of flicker reduction may be achieved.

Figure 4:
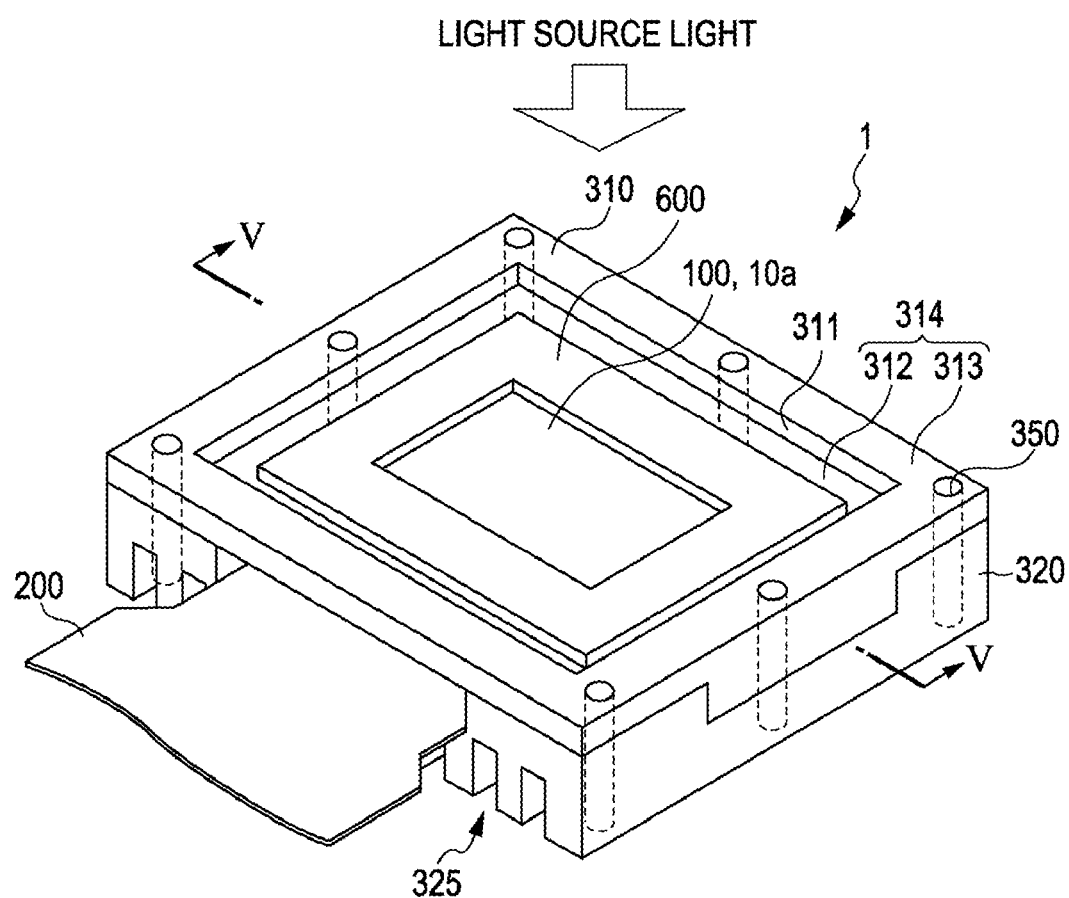
FIG. 4 is a perspective view showing an overall configuration of the electro-optical device according to the first embodiment.
Figure 5:
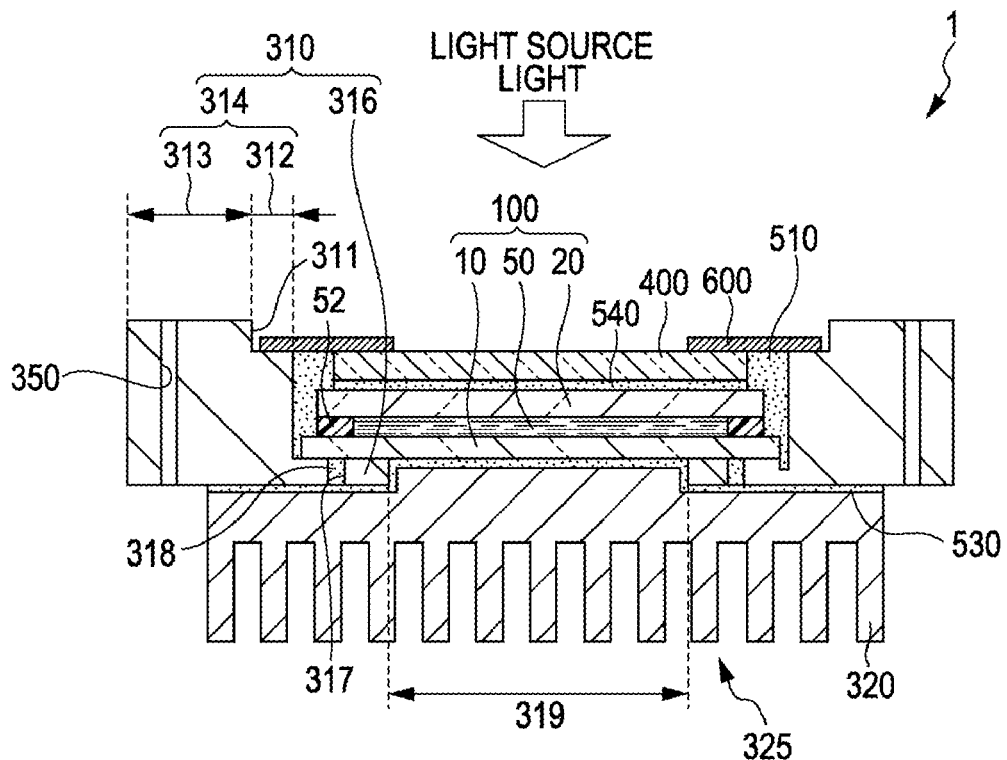
FIG. 5 is a cross-sectional view showing a specific configuration of the electro-optical device according to the first embodiment.

Next, an overall configuration of the electro-optical device according to the embodiment will be described with reference to FIG. 4. Here, FIG. 4 is a perspective view showing an overall configuration of an electro-optical device 1 according to the first embodiment, and FIG. 5 is a cross-sectional view taken from V-V line of FIG. 4. In addition, detailed components of the liquid crystal panel 100 shown in FIGS. 1 and 2 will be appropriately omitted in drawings after FIG. 4.

The electro-optical device according to the embodiment includes the liquid crystal panel 100, a flexible substrate 200, a frame 310, a heat sink 320, and a parting plate 600. In addition, the frame 310 may be an example of a "holding member" of the invention, the heat sink 320 may be an example of a "heat radiating member" of the invention, and the parting plate 600 may be an example of a "light shielding plate" of the invention.

Even though not shown in FIGS. 4 and 5, the flexible substrate 200 may be joined to an external connection terminal 102 of the liquid crystal panel 100. The flexible substrate 200 may be a substrate including a signal interconnection for transmitting various control signals required for an electro-optical operation of the above described liquid crystal panel 100, and may be formed such that a signal interconnection may be patterned in a base material such as polyimide, or the like. In addition, on the flexible substrate 200, a driving IC chip including at least a part of a driving circuit for driving the liquid crystal panel 100 may be arranged. In addition, one end of the flexible substrate 200 connected to the liquid crystal panel 100 and the other end thereof may be drawn out of the outside of the frame 310 and the heat sink 320, and may be connected to an external circuit (not shown) for supplying the various control signals required for the electro-optical operation of the liquid crystal panel 100.

The frame 310 may include a main body part 314 and a holding part 316. The frame 310 may hold the liquid crystal panel 100. The frame 310 may be configured to include a metal having superior conductivity such as iron, copper, aluminum, magnesium, or the like, and together with the heat sink 320 may perform heat radiation of the liquid crystal panel 100.

In a side of the main body part 314 of the frame 310 where the light source light is incident, a step 311 may be provided. An inner side area from the step 311 may be formed to be indented in comparison with an outer side area from the step 311. In the following description, the indented area formed in the inner side from the step 311 may be referred to as a "recess 312", and the outer side area from the step 311 may be referred to as an "attaching part 313".

In the attaching part 313, a plurality of screw holes 350 may be provided. A bolt which is not shown may pass through the screw holes 350, and the frame 310 may be fixed to the external member, that is, an example of a "member to be mounted" of the invention by tightening the bolt.

The parting plate 600 may be attached to the recess 312. The parting plate 600 may be provided in a window form so as to surround the image display area 10a of the liquid crystal panel 100 as shown in FIG. 4, and prevent light from being incident to any area except for the image display area 10a. The parting plate 600 may be made of a material having lower light reflectivity in comparison with other materials constituting the electro-optical device 1 such as the frame 310, or the like. Specifically, the parting plate 600 may be made from SUS304 of a representative kind of austenitic stainless steel. The parting plate 600 may be engaged with the frame 310 in an engagement part not shown.

The holding part 316 of the frame 310 may be formed to be extended from the main body part 314 in the opposite side of a side in which display light is incident, and may be in contact with the liquid crystal panel 100 from the lower side to thereby hold the liquid crystal panel 100.

In the holding part 316, an opening 317 for filling which is used for filling an adhesive 318 having conductivity, that is, an example of a thermally conductive member for fixing the liquid crystal panel 100 to the holding part 316 may be formed. The opening 317 for filling may be an example of an "adhesive opening" of the invention. The opening 317 for filling may be provided so that the holding part 316 passes through the opening 317 towards a surface contacting the liquid crystal panel 100.

The frame 310 may be bonded together by an adhesive 510 filled between the frame and the liquid crystal panel 100.

On a surface side of the opposing substrate 20 constituting the liquid crystal panel 100 that does not face the TFT array substrate 10, a dustproof substrate 400 may be affixed by a transparent adhesive 540. The dustproof substrate 400 may function to protect the image display area 10a of the liquid crystal panel 100 from dirt or dust.

Figure 6:
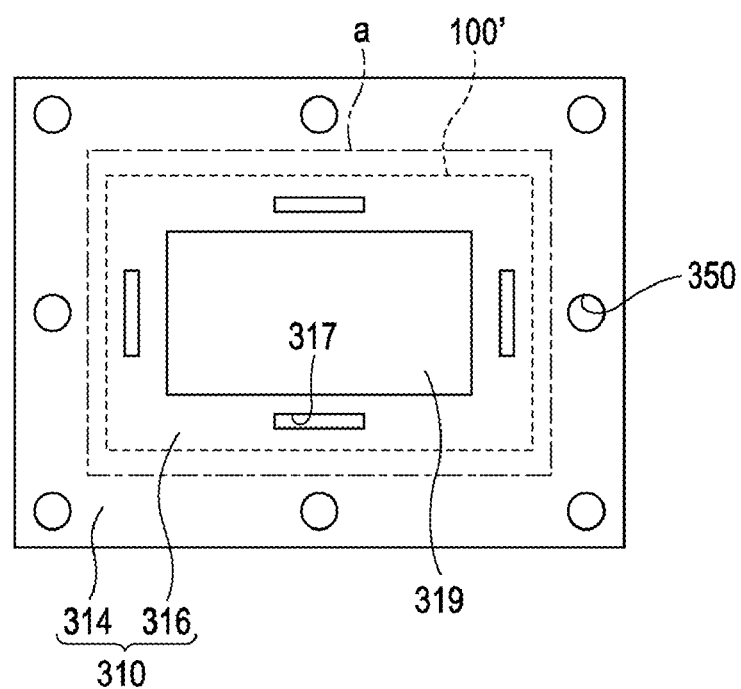
FIG. 6 is a plan view showing a frame extracted from the electro-optical device according to the first embodiment.

Here, referring to FIG. 6, a configuration of the frame 310 viewed from the opposite side to the side in which the display light is incident will be described. FIG. 6 is a plan view obtained when viewed from the opposite side to the side in which the display light is incident by extracting the frame 310 from the electro-optical device 1 according to the first embodiment. In addition, in FIG. 6, a boundary of the main body part 314 and the holding part 316 is shown as a dashed line a. Also, a dotted line 100' may transparently show the contours of the liquid crystal panel 100.

The holding part 316 may be formed to be protruded toward the center portion from the main body part 314. Here, an opening 319 may be provided inside the holding part 316. The heat sink 320 not shown in FIG. 6 may be disposed in the opening 319, and may improve the heat radiation performance of the liquid crystal panel 100 by contacting the liquid crystal panel 100 through the opening 319.

The holding part 316 may be formed to be extended to the inner side from the dotted line 100' showing the contours of the liquid crystal panel 100. Due to this, a part of the holding part 316 formed in the inner side from the dotted line 100' may hold the liquid crystal panel 100 by contacting the liquid crystal panel 100 from the lower side. In this manner, since the holding part 316 is formed along the opening 319 (that is, over the entire circumference of an edge of the opening 319), it is possible to stably support the whole edge of the liquid crystal panel 100 from the lower side.

Meanwhile, since the holding part 316 is formed to surround the opening 319, the holding part 316 does not entirely contact the liquid crystal panel 100. That is, by providing the opening 319 to the holding part 316, the contact area between the liquid crystal panel 100 and the holding part 316 may be kept small. Here, since the magnitude of stress transmitted from the frame 310 to the liquid crystal panel 100 depends on the contact area between the holding part 316 and the liquid crystal panel 100, the stress applied to the liquid crystal panel 100 may be reduced by reducing the contact area.

In addition, since the holding part 316 may be thin compared to the main body part 314, the holding part 316 may have a low degree of rigidity compared to that of the main body part 314. In other words, the holding part 316 may have elasticity in comparison with the main body part 314. Accordingly, for example, the stress transmitted from the main body part 314 to the liquid crystal panel 100 may be absorbed by the elasticity of the holding part 316, whereby the stress transmitted to the liquid crystal panel 100 may be reduced.

A plurality of openings 317 for filling may be formed along each side of the opening 319. Due to this, the liquid crystal panel 100 may be fixed to the holding part 316 in a plurality of areas where the opening 317 for filling is provided, whereby the liquid crystal panel 100 may be stably housed within the frame 310.

Referring again to FIGS. 4 and 5, the heat sink 320 may be disposed to be in contact with the liquid crystal panel 100 through the opening 319 from a rear surface side positioned in the opposite side of a display surface. The heat sink 320 may have a heat radiation part 325 for radiating heat generated in the liquid crystal panel 100. Due to this, heat may be accumulated in the liquid crystal panel 100, and thereby it is possible to prevent occurrence of various defects and malfunctions of the liquid crystal panel 100. In addition, by reducing occurrence of distortion of components of the electro-optical device 1 due to the heat, stress generated within the device may be reduced. In addition, to enhance heat radiation efficiency, the heat sink 320 may be configured to include a material having high conductivity, such as iron, copper, aluminum, or the like.

In the heat sink 320, the frame 310 and the liquid crystal panel 100 may be bonded to each other by an adhesive 530. In addition, the frame 310 and the heat sink 320 may be bonded to each other by an adhesive unit not shown. In this case, the bonding may be performed by fitting a recess provided in the frame 310 and a protrusion provided in the heat sink, or by using a screw or the like. The adhesive 530 may have conductivity higher than the air, efficiently transmitting heat generated in the liquid crystal panel 100 to the heat sink 320, and having a function of enhancing the heat radiation performance in the heat radiation part 325.

According to the embodiment, the heat sink 320 may enhance heat radiation efficiency by being arranged to be in contact with the liquid crystal panel 100 through the opening 319 of an area where the holding part 316 of the frame 310 is not formed.

In addition, according to the embodiment, the adhesive 530 may be coated to fill between the frame 310 and the heat sink 320 and between the liquid crystal panel 100 and the heat sink 320; however, the adhesive 530 may be coated on only a part thereof. Also, the adhesive 530 may not be coated between the frame 310 and the heat sink 320 and between the liquid crystal panel 100 and the heat sink 320. Further, in addition to or instead of the adhesive 530, a sheet or grease having conductivity or the like may be used.

Figure 7:
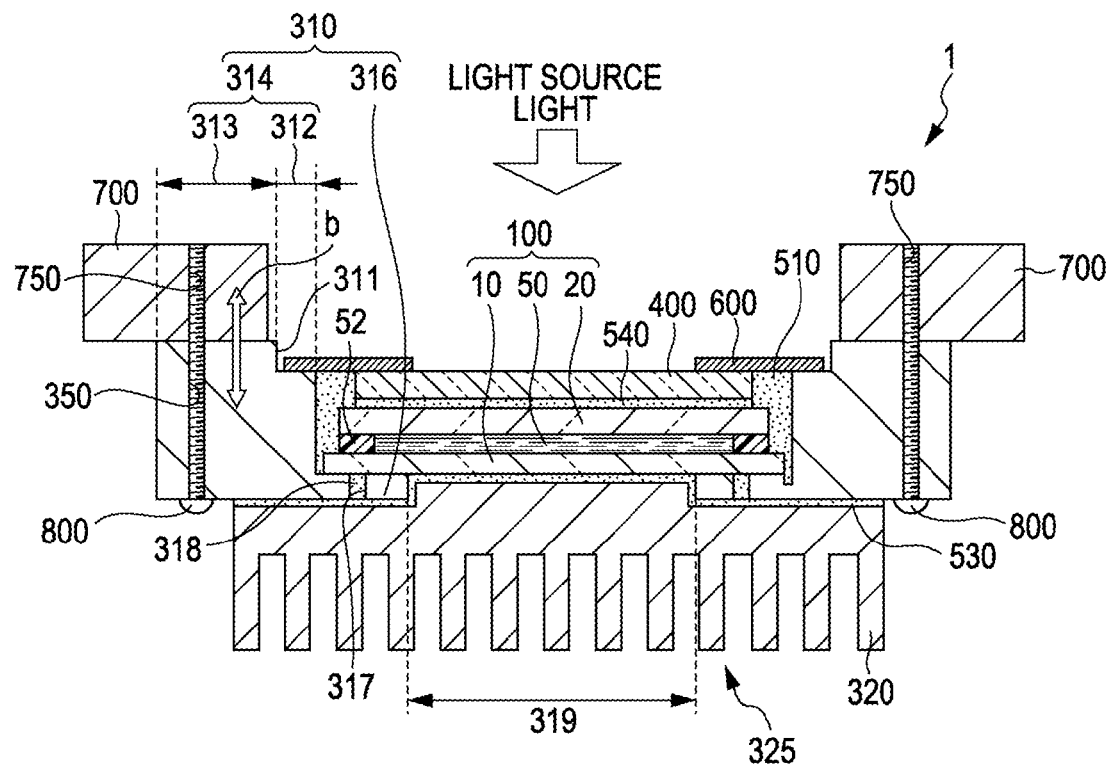
FIG. 7 is a schematic cross-sectional view showing stress generated in the electro-optical device according to the first embodiment.

Here, referring to FIG. 7, in a case in which the attaching part 313 of the frame 310 is attached to an external member 700, stress generated in the electro-optical device 1 according to the embodiment will be described. FIG. 7 is a schematic cross-sectional view showing stress generated in the electro-optical device 1 according to the first embodiment when the attaching part 313 of the frame 310 is attached to the external member 700.

In addition, the external member 700 is an example of a "member to be mounted" of the invention, and specifically, may be a tool member for attaching the electro-optical device 1 to an inner wall of the liquid crystal projector when the electro-optical device 1 according to the embodiment is attached, as a light valve, to a liquid crystal projector which will be described below as an electronic apparatus including the electro-optical device 1.

The frame 310 may be fixed to the external member 700 in such a manner that a bolt 800 is inserted and fastened to pass through the screw hole 350 formed in the frame 310 and a screw hole 750 formed in the external member 700. In addition, a screw which is not shown may be formed on an outer surface of the bolt 800, the bolt 800 may be fastened by rotating the bolt 800 using a screwdriver, or the like, whereby the frame 310 may be tightly fixed to the external member 700.

When the bolt 800 is fastened, stress may be generated inside the electro-optical device 1. In FIG. 7, an example of the stress generated in the frame 310 is schematically shown as a white arrow b. In this manner, the stress generated in the frame 310 may be transmitted to the liquid crystal panel 100 through various members (for example, the holding part 316 of the frame 310, the parting plate 600, and the like) arranged between the frame 310 and the liquid crystal panel 100.

According to the embodiment, the parting plate 600 may be in contact with the liquid crystal panel 100 from the display surface side, and thereby the liquid crystal panel 100 may be held. Due to this, the stress generated in the frame 310 may be transmitted to the liquid crystal panel 100 through the parting plate 600. Since the parting plate 600 is formed to have a thin plate shape, a little distortion (that is, the parting plate 600 having elasticity) may occur in a vertical direction when a force is exerted. Accordingly, the stress transmitted from the frame 310 through the parting plate 600 may be absorbed by the elasticity of the parting plate 600, and the stress transmitted from the frame 310 to the liquid crystal panel 100 may be reduced.

In addition, an example in which the frame 310 may be fixed to the external member 700 by inserting the bolt 800 through the screw holes 350 and 750 is shown; however, the attaching part 313 of the frame 310 may be fixed to the external member 700 through the adhesive without providing the screw hole 350 to reduce the stress transmitted from the frame 310 to the liquid crystal panel 100. In addition, among the attaching parts 313 of the four corners of the frame 310, two attaching parts 313 on the diagonal line may be fixed to the external member 700 by inserting the bolt 800 into the screw holes 350 and 750, and two attaching parts 313 on the remaining diagonal line may be fixed to the external member 700 using the adhesive.

As described above, according to the embodiment, the liquid crystal panel 100 may be held by the holding part 316 extended from the main body part 314 and the parting plate 600, and thereby, the stress transmitted to the liquid crystal panel 100, and occurrence of color irregularity in the display image may be prevented.

Second Embodiment

Figure 8:
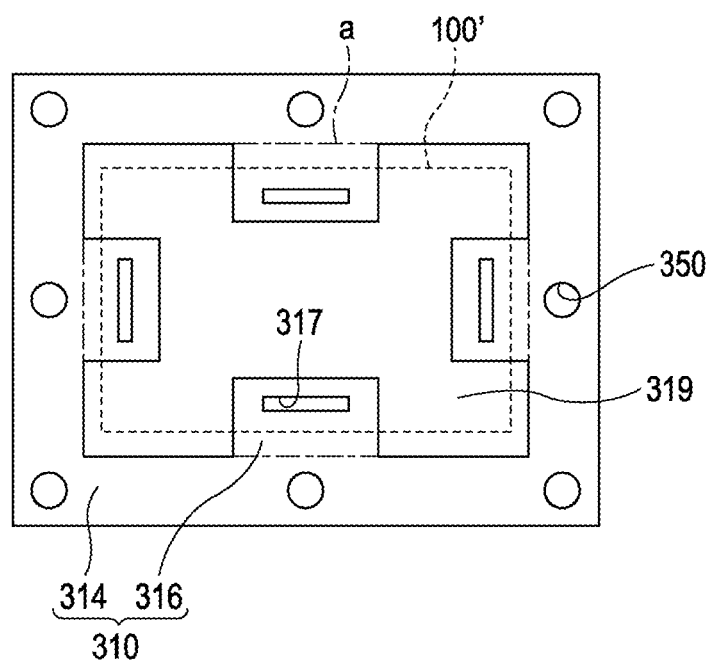
FIG. 8 is a plan view showing a frame extracted from an electro-optical device according to a second embodiment.

Subsequently, the electro-optical device according to a second embodiment will be described with reference to FIG. 8. FIG. 8 is a plan view showing the frame 310 extracted from an electro-optical device according to the embodiment, and has the same effects as those in FIG. 6. In addition, in the electro-optical device according to the second embodiment, the same reference numerals may be applied to the same components as those of the electro-optical device 1 according to the first embodiment, and detailed descriptions thereof will be omitted. In addition, in FIG. 8, a boundary of the main body part 314 and the holding part 316 is shown as a dashed line a. Also, a dotted line 100' transparently shows the contours of the liquid crystal panel 100.

According to the embodiment, a shape of the opening 319 may differ in comparison with the first embodiment. In the embodiment, the holding part 316 may be formed to be extended in a convex form toward the center portion from the main body part 314. The opening 319 may be defined as an area closed by the main body part 314 and the holding part 316, and the heat sink 320 may be arranged in the opening 319. The heat sink 320 may be in contact with the liquid crystal panel 100 through the opening 319, thereby improving the heat radiation performance of the liquid crystal panel 100.

The holding part 316 may be formed to be partially extended in a convex form to an inner side from a center portion around a rectangular area defined by an inner wall of the main body part 314. A distal end of the holding part 316 extended in the convex form may be supported by being in contact with the liquid crystal panel 100 from a rear side. In this manner, since the holding part 316 is extended in the convex form, when compared with a case in which the holding part is formed along the opening 319 (that is, over the entire circumference of an edge of the opening 319) as described in the first embodiment, the contact area between the liquid crystal panel 100 and the holding part 316 may be kept small. Here, since the magnitude of stress transmitted from the frame 310 to the liquid crystal panel 100 depends on the contact area between the holding part 316 and the liquid crystal panel 100, the stress applied to the liquid crystal panel 100 may be reduced by reducing the contact area.

Third Embodiment

Figure 9:
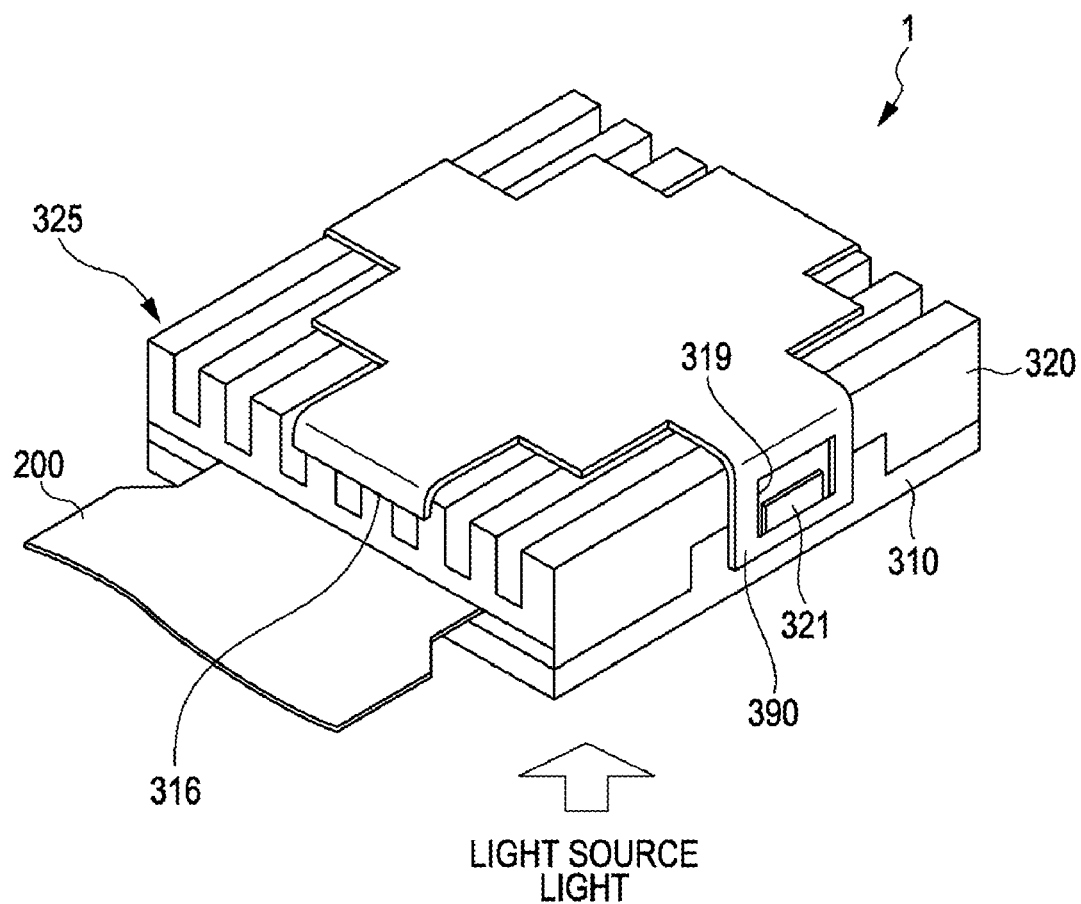
FIG. 9 is a perspective view showing an overall configuration of an electro-optical device according to a third embodiment.

Subsequently, the electro-optical device according to a third embodiment will be described with reference to FIG. 9. FIG. 9 is a perspective view showing an overall configuration of an electro-optical device according to a third embodiment. In addition, in the electro-optical device according to the third embodiment, the same reference numerals may be applied to the same components as those of the electro-optical device 1 according to the first embodiment, and detailed descriptions thereof will be omitted.

The third embodiment in which the heat sink 320 may be attached to the frame 310 using a hook 390 may be different from the above described embodiments. The hook 390 may be an example of a "hook member" of the invention. The hook 390 may fix between the frame 310 and the heat sink 320 by engaging an opening 319 provided in a side wall with a protrusion 321 provided in the frame 310. In addition, the hook 390 may have a holding part 316 so as to stabilize the position of the heat sink 320 attached to the frame 310.

In the above described embodiments, since the heat sink 320 may be rigidly fixed to the frame 310 by the adhesive 350, stress generated in the frame 310 and the heat sink 320 may be easily transmitted to the liquid crystal panel 100. Meanwhile, in the third embodiment, for example, since the heat sink 320 may be fixed by engaging the hook 390 with the frame 310, the generated stress may be reduced. Consequently, by being fixed by the hook 390, distortion may barely occur in the frame 310 and the heat sink 320, and the occurrence of stress may be effectively prevented.

In addition, since the hook 390 is provided at the opposite side of the display surface of the liquid crystal panel 100, it may be impossible to shield from incident light being incident to the image display area 10a of the liquid crystal panel 100. Due to this, it is possible to fix the heat sink 320 to the frame 310 in an effective layout without interrupting a display of the liquid crystal panel 100.

Electronic Apparatus

Figure 10:
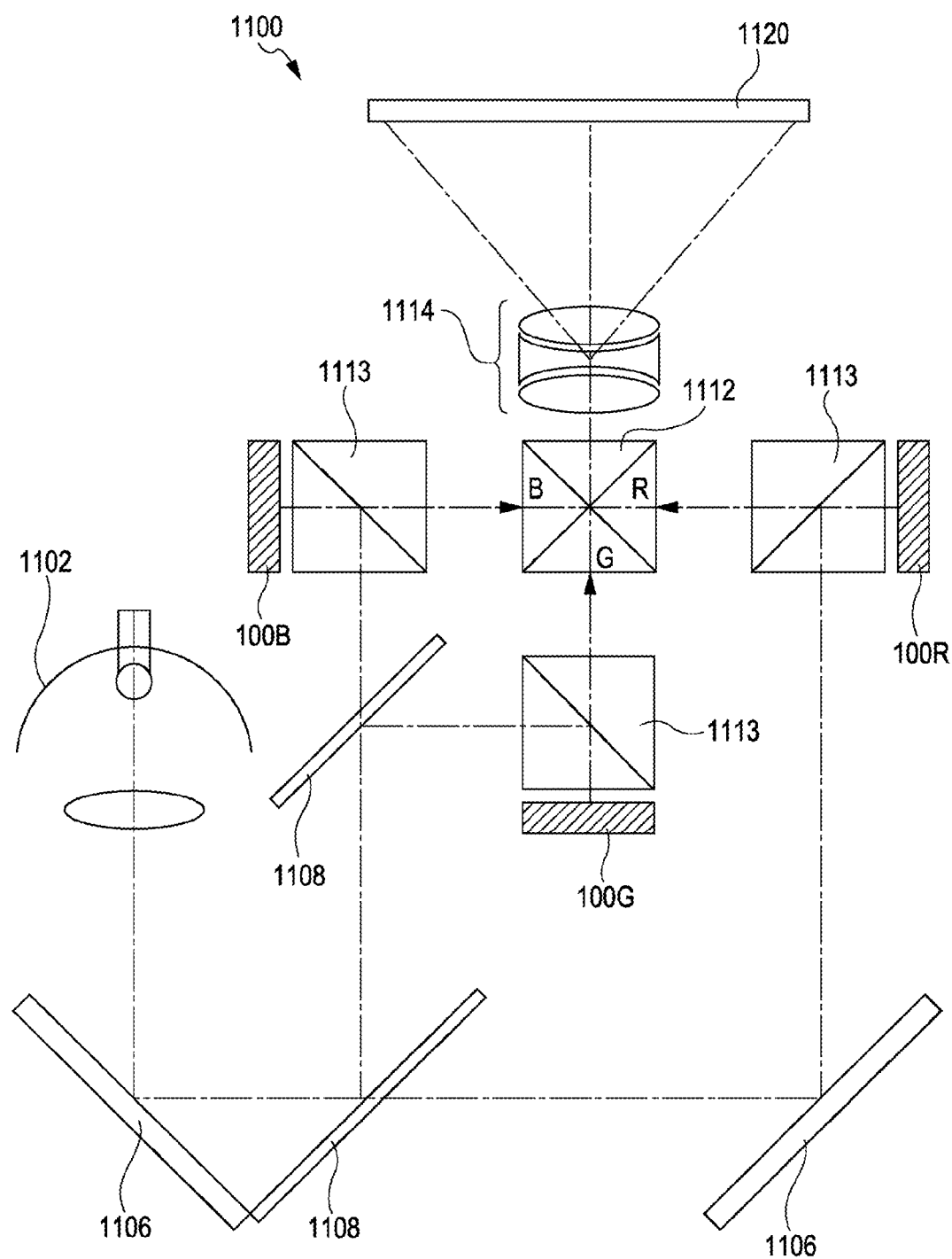
FIG. 10 is a plan view showing a configuration of a projector as an example of an electronic apparatus to which the electro-optical device is applied.

Hereinafter, a case in which the liquid crystal device of the above described electro-optical device is applied to various electronic apparatuses will be described. Here, as the electronic apparatus of the invention, a projection type liquid crystal projector may be used. FIG. 10 is a plan view showing a configuration of the projection type liquid crystal projector as an example of an electronic apparatus to which the electro-optical device is applied.

In FIG. 10, a liquid crystal projector 1100 according to the embodiment may be configured as a multi-panel type color projector using three liquid crystal light valves 100R, 100G, and 100B each for RGB. In each of the liquid crystal light valves 100R, 100G, and 100B, the above described reflective liquid crystal device may be used.

As shown in FIG. 10, in the liquid crystal projector 1100, when projection light is generated from a lamp unit 1102 of a white light source such as a metal halide lamp, the projection light may be divided into light components R, G, and B corresponding to three primary colors of RGB by two mirrors 1106, two dichroic mirrors 1108, and three polarizing beam splitters (PBSs) 1113, and the divided light components may be transmitted to each of the liquid crystal light valves 100R, 100G, and 100B corresponding to each color. In addition, to prevent a light loss in a light path, lens may be appropriately provided in the middle of the light path. In addition, the light components corresponding to each of the three primary colors modulated by the liquid crystal light valves 100R, 100G, and 100B may be synthesized by a cross prism 1112, and then may be projected as a color image to a screen 1120 through a projection lens 1114.

In addition, in the liquid crystal light valves 100R, 100G, and 100B, since light corresponding to each of the primary colors of R, G, and B enters by the dichroic mirrors 1108 and the PBS 1113, there is no need to provide a color filter.

In addition to the electronic apparatus described with reference to FIG. 10, devices including a mobile type personal computer, a cellular phone, a liquid crystal television, a viewfinder-type or a monitor direct view-type video cassette recorder, a car navigation device, a pager, an electronic diary, a calculator, a word processor, a workstation, a video phone, a POS terminal, a touch panel, or the like may be provided. Needless to say, the electro-optical device of the invention may be applicable to these various electronic apparatuses.

The invention may be applicable to a transmission liquid crystal device, a plasma display panel (PDP), a field emission display (FED, SED), an organic EL display, a digital micromirror display (DMD), and an electrophoresis apparatus in addition to the reflective liquid crystal device described in the above embodiments.

The invention shall not be limited to the above described embodiments, and is suitably modified in the scope without departing from the principles and spirit of the disclosure that can be read from the scope of the claims and the entire specification. The electro-optical device which accompany with the modification and the electronic apparatus including the electro-optical device are included in the scope of the invention.

The entire disclosure of Japanese Patent Application No. 2010-30998, filed Feb. 16, 2010 is expressly incorporated by reference herein.

What is claimed is:

1. An electro-optical device, comprising:
    an electro-optical panel;
    a holding member that includes a main body part arranged to surround the periphery of the electro-optical panel, and a holding part protruded from the main body part and holding the electro-optical panel; and
    a heat radiating member that is disposed opposing the electro-optical panel through an opening of the holding member from the opposite side of a light incident plane of the electro-optical panel.

2. The electro-optical device according to claim 1, wherein the holding part is formed over the entire circumference of the opening of the holding member.

3. The electro-optical device according to claim 1, wherein a part of the holding part is protrusively formed in a convex shape from the main body part.

4. The electro-optical device according to claim 1, wherein the holding member includes an adhesive opening formed in a portion of the holding part contacting the electro-optical panel, and the electro-optical panel is fixed to the holding part by an adhesive filled in the adhesive opening.

5. The electro-optical device according to claim 1, further comprising:
    a light shielding plate that is provided to be in contact with the electro-optical panel and the holding member from the incident plane side of the electro-optical panel, and formed to at least partially surround a display area of the electro-optical panel.

6. The electro-optical device according to claim 1, further comprising:
    a hook member that is provided to fix the heat radiating member to the holding member, from the opposite side of a plane of the heat radiating member opposing the electro-optical panel.

7. An electronic apparatus including the electro-optical device described in claim 1.

* * * * *